US000001416H

United States Statutory Invention Registration [19]

[11] Reg. Number: H1416

Berge

[43] Published: Feb. 7, 1995

[54] METHOD FOR EXTENDING THE LIFE OF A CURVED SECTION IN A PIPE FOR THE TRANSPORT OF FINELY DIVIDED FLUIDIZED PARTICULATE SOLIDS

[76] Inventor: Jon A. Berge, 24261 Sparrow St., Lake Forest, Calif. 92630

[21] Appl. No.: 265,906

[22] Filed: Jun. 27, 1994

[51] Int. Cl.[6] ..... B65G 51/18; B65G 53/52
[52] U.S. Cl. ..... 406/193; 138/37
[58] Field of Search ..... 406/193; 138/37

[56] References Cited

PUBLICATIONS

Cheng Fluid Systems, Inc., Letter to Jon Berge, Aug. 6, 1992.
VaporKote, Inc., May 27, 1987, "Boron Gas Diffusion Coatings".
Cheng Fluid Systems, Inc., letter to Meir Snir, Oct. 24, 1991.
Turbine Metal Technology, Inc., "A Better Diffusion Coating for Centrifugal Pumps" date unknown but available to inventor as reference).
Chemical Engineering, Sep. 1992, "New In-Pipe Flow Conditioner Cuts Fluid Problems".
Cheng Fluid Systems, Inc. Technical Bulletin, Sep. 1990 "Cheng Rotation Vanes (CRV)".
Machine Design, Aug. 23, 1990, "Rotational Vane Smooths Out Fluid Flow".

*Primary Examiner*—David Brown
*Attorney, Agent, or Firm*—F. Lindsey Scott

[57] ABSTRACT

A method for extending the life of a curved section in a pipe wherein finely divided particulate solids are transported in fluidized flow by positioning pre-rotation vanes upstream of the curved section, the improvement comprising the use of pre-rotation vanes fabricated of steel and hardened by boron vapor diffusion hardening.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR EXTENDING THE LIFE OF A CURVED SECTION IN A PIPE FOR THE TRANSPORT OF FINELY DIVIDED FLUIDIZED PARTICULATE SOLIDS

BACKGROUND OF THE INVENTION

1. Field of the Invention

This invention relates to the use of pipes for the transportation of fluidized finely divided particulate solids and more particularly to an improvement in such methods whereby the service life of the pipes may be extended.

2. Background Art

In numerous industrial applications such as fluidized catalytic cracking operations, finely divided fluidized particulate solids such as fluid catalytic cracking catalyst particles are transported as a fluidized stream of particulate solids. Such fluidized finely divided particulate solids are extremely damaging to the pipes in which they are transported, particularly at curved surfaces such as elbows and the like. It is not uncommon to find that the life of elbows in pipes used for such applications may be as little as three to four months. Typically, the outer radius of the elbow fails as a result of the gouging erosion resulting from the flow of the fluidized finely divided particulate solids through the pipe and around the elbow. Since such processes are frequently operated and a high degree of reliability is desired, the requirement to shut down the process and replace elbows at this frequency is very disadvantageous. It has been found that fluidized finely divided particulate solids can be transported through such pipes and the life of the curved sections of the pipe, such as elbows, extended by the use of pre-rotation vanes such as Cheng Rotation Vanes marketed by Cheng Fluid Systems, Inc. Cheng Rotation Vanes comprise a set of pre-rotation vanes installed upstream of a pipe elbow to alter the characteristics of the incoming flow to the elbow to compensate for the turning effects of the particular elbow geometry. These pre-rotation vanes have been effective to extend the life of elbows positioned in pipes used for the transportation of fluidized finely divided particulate solids. Such vanes are considered to be known to those skilled in the art and are described in a technical bulletin issued by Cheng Fluid Systems, Inc., Volume 1, No. 2, Sep. 1990.

The pre-rotation vanes are frequently fabricated of carbon steel such as carbon or low alloy steel such as steel containing about 2.25% chrome and about 0.5% molybdenum. Other materials can be used but steel is a frequent material of construction for the pre-rotation vanes. Unfortunately, the steel vanes can be rapidly eroded and degraded by impact with the fluidized finely divided particulate solids so that the pre-rotation vanes themselves begin to be quickly eroded and their effectiveness reduced. To overcome this shortcoming, harder materials have been overlaid on the steel vanes to protect the pre-rotation vanes in such applications. STELLITE (trademark of Stoody Deloro Stellite, Inc. for metal alloys) alloy is one material which has been frequently used as a hard facing overlay. The STELLITE alloy is generally welded onto the carbon steel pre-rotation vanes to produce the final prerotation vanes for inclusion in the pipe. Unfortunately, STELLITE alloy has a Rockwell C hardness of about 70 to 75 which is roughly the same as the Rockwell C hardness of the catalytic cracking catalyst solids. Further, the STELLITE alloy, when welded onto the pre-rotation vanes, results in thicker vanes to the detriment of flow through the pipe. Further, fluidized finely divided fluid catalytic cracking catalyst is frequently transported at temperatures approximating 1300° F. which is outside the upper range generally considered suitable for STELLITE alloy.

Accordingly, an improved method for extending the life of pre-rotation vanes used in pipes and the life of pipes used for the transportation of fluidized catalytic cracking catalyst solids has been sought.

SUMMARY OF THE INVENTION

According to the present invention, an improvement is provided in a method for extending the life of a curved section in a pipe wherein finely divided particulate solids are transported in fluidized flow by positioning pre-rotation vanes upstream of the curved section, the improvement comprising the use of pre-rotation vanes fabricated of carbon steel and hardened by boron vapor diffusion hardening.

DESCRIPTION OF PREFERRED EMBODIMENTS

According to the present invention, pre-rotation vanes positioned upstream from a curved section in a pipe used for the transportation of fluidized finely divided solids are hardened by a boron gas diffusion process described in a publication by VaporKote, Inc. entitled "Boron Gas Diffusion Coating" published May 27, 1987. The boron vapor diffusion hardening process is considered to be well known to those skilled in the art and generally consists of packing the part to be treated in boron powder, placing the part packed in the boron powder in an oven at approximately 1800° F. where the boron powder vaporizes and, as vaporized, diffuses into the metal, thereby hardening all surfaces of the metal. The resulting boron vapor diffusion hardened pre-rotation vanes are smoother than can be readily produced using STELLITE alloy overlays and have a Rockwell C hardness of about 80 to about 85. The outer surface of the boron vapor diffusion hardened pre-rotation vanes is now harder than the fluidized catalytic cracking catalyst particles.

Further, the pre-rotation vanes are not thickened and do not impede flow to any greater extent than the carbon steel pre-rotation vanes initially passed to the boron vapor diffusion hardening treatment.

Use of these boron vapor diffusion hardened prerotation vanes in pipes used for the transportation of fluidized finely divided fluid catalytic cracking catalyst solids has resulted in greatly extended life for the pipe elbows positioned downstream from the boron vapor diffusion hardened pre-rotation vanes.

The use of boron vapor diffusion hardening is considered to be well known to those skilled in the art and will not be discussed in detail.

Similarly, the design and fabrication of the pre-rotation vanes is considered to be well known to those skilled in the art and will not be discussed further except to note that no adjustment in the vane thickness is necessary to allow for the added thickness as required with the STELLITE alloy hard surfacing normally used in such applications. In other words, the pre-rotation vanes can be designed of carbon steel at the desired size and then passed to boron vapor diffusion hardening which achieves the desired hardening with no change in pre-rotation vane dimensions.

Having thus described the invention by reference to certain of its preferred embodiments, it is respectfully pointed out that such embodiments are illustrative rather than limiting in nature and that many variations and modifications are possible within the scope of the present invention. Many such variations and modifications may be considered obvious and desirable by those skilled in the art based upon the foregoing description of preferred embodiments.

Having thus described the invention, I claim:

1. In a method for extending the life of a curved section in a pipe wherein finely divided particulate solids are transported in fluidized flow by positioning pre-rotation vanes upstream of said curved section, the improvement comprising the use of pre-rotation vanes fabricated of steel and hardened by boron vapor diffusion hardening.

2. The improvement of claim 1 wherein said particulate solids are finely divided particulate fluidized catalytic cracking catalyst having a Rockwell C hardness from about 70 to about 75.

3. The method of claim 1 wherein said boron vapor diffusion hardened pre-rotation vanes have a Rockwell C hardness from about 80 to about 85.

4. The improvement of claim 1 wherein said finely divided particulate solids are finely divided particulate fluidized catalytic cracking catalyst solids and wherein said finely divided particulate solids are transported in said pipe at a temperature of about 1300° F.

* * * * *